Nov. 8, 1960
C. D. SMITH
2,959,243
SOUND ABSORBING STRUCTURE
Filed March 29, 1956
3 Sheets-Sheet 1
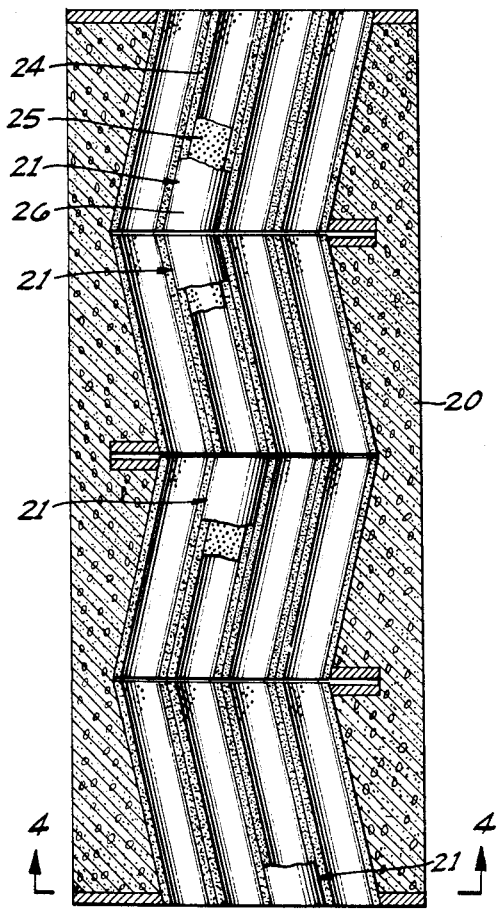
FIG. 3.
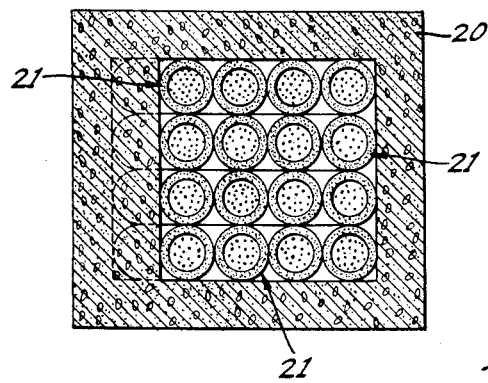
FIG. 4.
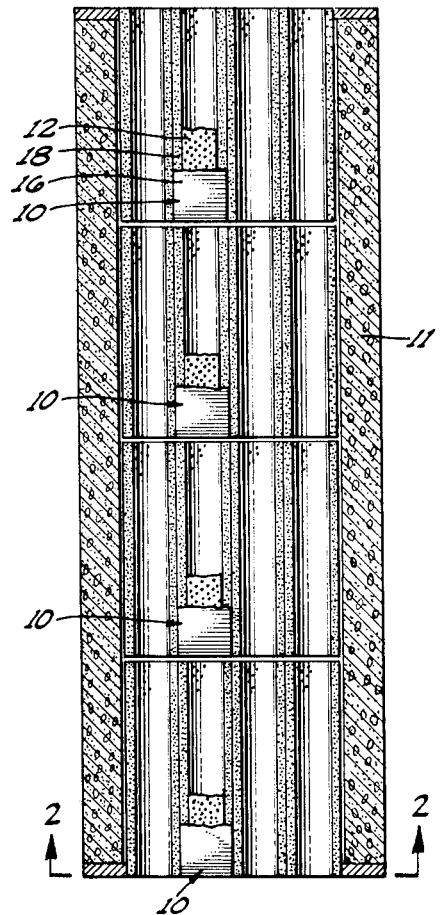
FIG. 1.
FIG. 2.
INVENTOR.
CLOYD D. SMITH
BY Lyon & Lyon
ATTORNEYS Nov. 8, 1960
C. D. SMITH
2,959,243
SOUND ABSORBING STRUCTURE
Filed March 29, 1956
3 Sheets-Sheet 2
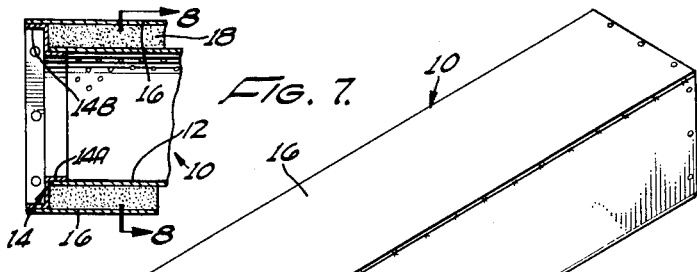
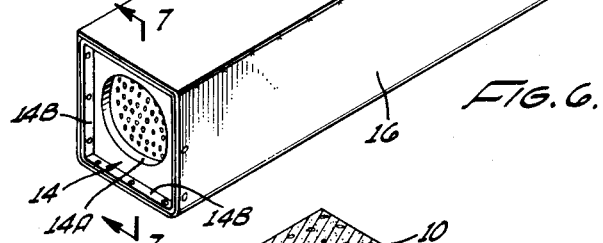
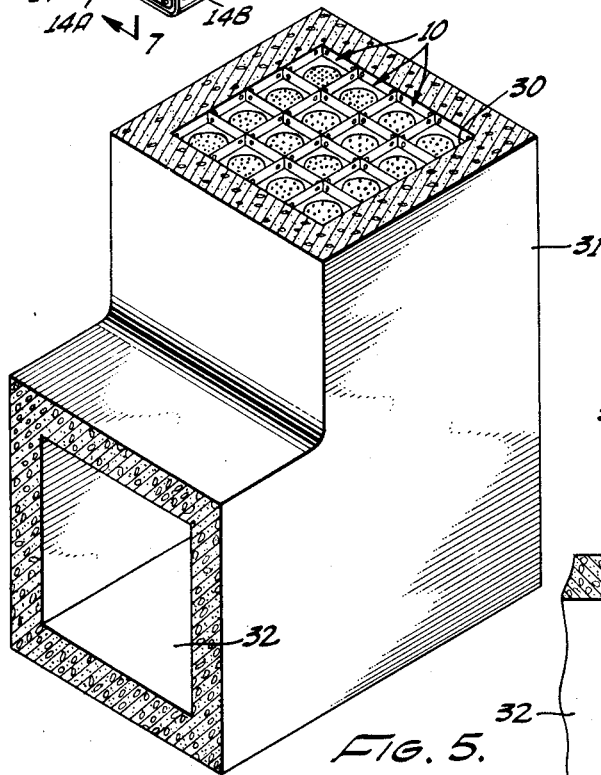
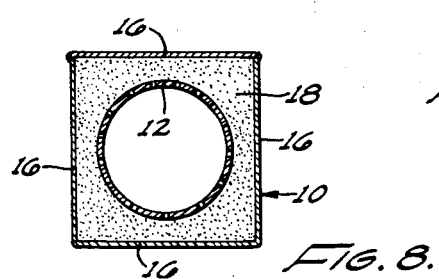
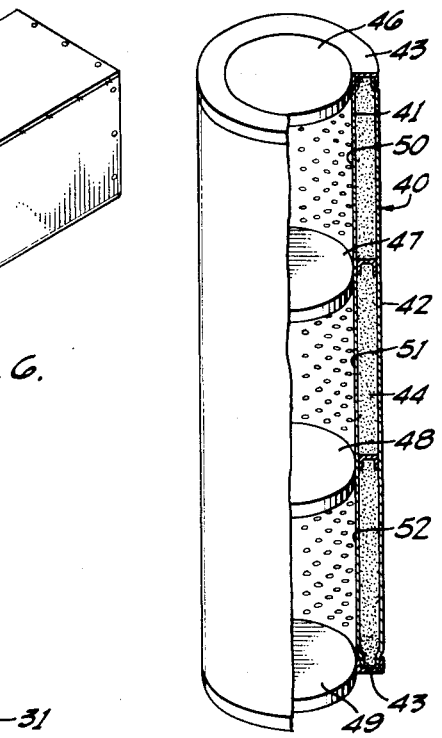
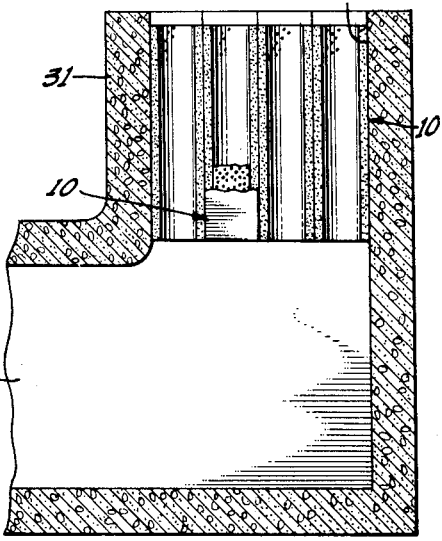
INVENTOR.
CLOYD D. SMITH
BY Lyon & Lyon
ATTORNEYS Nov. 8, 1960 C. D. SMITH 2,959,243
SOUND ABSORBING STRUCTURE
Filed March 29, 1956 3 Sheets-Sheet 3
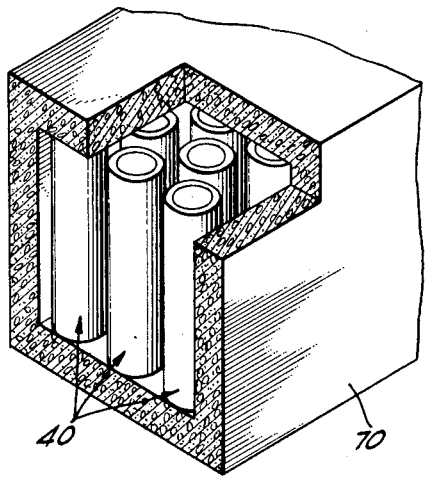
FIG. 12.
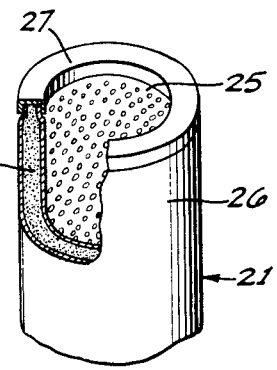
FIG. 14.
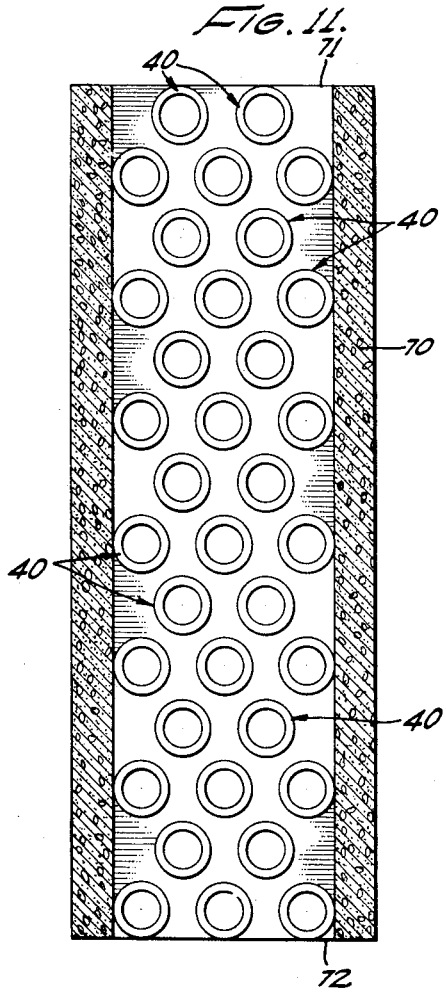
FIG. 11.
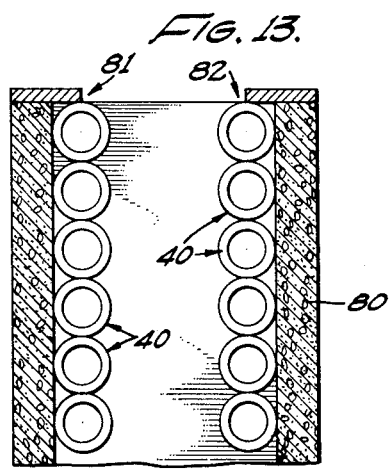
FIG. 13.
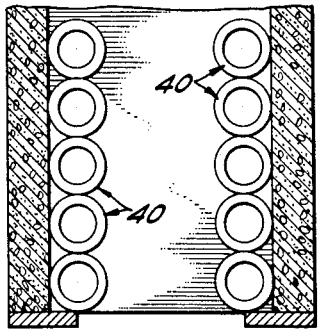
INVENTOR.
CLOYD D. SMITH
BY Lyon & Lyon
ATTORNEYS

United States Patent Office 2,959,243
Patented Nov. 8, 1960

2,959,243

SOUND ABSORBING STRUCTURE

Cloyd D. Smith, Los Angeles, Calif., assignor to General Sound Control, Inc., Los Angeles, Calif., a corporation of California Filed Mar. 29, 1956, Ser. No. 574,729

6 Claims. (Cl. 181—59)

The present invention relates to sound absorbing structures and components used in the same, and more particularly to structures designed to absorb the objectionable noises created during the ground testing of all types of airplanes and engines.

With the increased use of jet engines, after burners and rocket engines, the noise levels are not only objectionable but are shown by scientific tests to be, in some cases, detrimental to the health of the personnel in the immediate neighborhood.

In order to obtain valid test data with a minimum of corrective calculations on ground tests of airplanes and engines, it is of great importance to keep test cell back pressures at a minimum. Also in testing powerful jet engines which create extremely high velocities and temperatures, it has been advantageous to provide secondary air for mixing with and cooling the exhaust gases. Since this secondary air flow often equals or exceeds that of the engine itself, the problem of velocity and back pressures is greatly magnified.

A principal object of the present invention is to provide an improved sound absorbing system and components therefor for the intakes, secondary intakes, test chambers and exhaust portion of airplane and engine test cells.

Another object of the present invention is to provide a second absorbing system built up of prefabricated units installed within an outer shell structure of precast concrete or steel panels which, in combination, substantially lowers costs and has higher efficiency than present structures.

A further object of the present invention is to provide a stack or tunnel which is divided into relatively small cylindrical ducts prefabricated of highly efficient sound absorbing units. The arrangement of these cylindrical or tubular sound absorbing ducts is in a honeycomb or similar pattern which greatly speeds installation, reduces costs and eliminates costly supporting structures.

A further object of the present invention is to provide a second absorbing system which is inherently strong due to its particular shape and which can easily be installed in test cells or ducts so as to facilitate stacking and to maintain building heights to a minimum with substantial reduction in costs.

Another specific object of the present invention is to provide an improved sound absorbing structure in which objectionable noise due to operation of jet engines is effectively absorbed or deadened without producing any substantial interference in the operation of such jet engines.

Another specific object of the present invention is to provide an improved sound absorbing structure which includes units through which air or other gases may be passed at extremely high velocities without destroying the effectiveness of such units.

Another specific object of the present invention is to provide improved sound absorbing structures in which novel units are arranged in a novel manner.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a transverse sectional view through an improved sound absorbing structure embodying features of the present invention.

Figure 2 is an end view of the structure illustrated in Figure 1.

Figure 3 is a transverse sectional view through another sound absorbing structure embodying features of the present invention.

Figure 4 is a view taken generally on the line 4—4 of Figure 3.

Figure 5 is a perspective view illustrating another sound absorbing structure embodying features of the present invention.

Figure 6 is a perspective view illustrating a sound absorbing unit of the type used in the arrangements shown in Figures 1 and 5.

Figure 7 is a sectional view taken generally on the line 7—7 of Figure 6.

Figure 8 is a sectional view taken substantially on the line 8—8 of Figure 7.

Figure 9 is a transverse sectional view through the structure shown in Figure 5.

Figure 10 is a perspective view which shows also, in section, details of a space resonator embodying features of the present invention.

Figure 11 is a transverse sectional view through another sound absorbing structure embodying features of the present invention, with sound or space resonators of the type illustrated in Figure 10 disposed therein.

Figure 12 is a perspective view showing in more detail a portion of the chamber shown in Figure 11.

Figure 13 is a transverse sectional view through still another form of sound absorbing structure embodying features of the present invention using space absorbers of the type illustrated in Figure 10.

Figure 14 is a perspective view showing also, in section, a portion of the units used in the arrangement shown in Figure 3.

In the arrangement shown in Figures 1 and 2, a plurality of tubes 10 are stacked in mutual parallelism in a generally rectangular concrete or, if desired, steel housing 11. Each one of the tubes 10 is square or rectangular in outer cross-section and has a centrally located cylindrical opening extending therethrough, and may be fabricated as shown in Figure 6. All of the air or gases pass through the center openings of these tubes. Substantially no air or gases pass along the outside surfaces of these tubes due to their stacking which is such that substantially the entire volume of housing 11 is filled by such tubes 10. The air or gases pass through the aligned center openings of four tubes in Figure 1. Each tube, as shown in Figures 6 and 7, comprises a central or internal annular foraminous sheath 12 which is secured at its opposite ends to flanged apertured end plates 14. The annular flanged portion 14A of the end plate 14 partially enters the tubular sheath 12 and snugly engages the same. The four straight flanges 14B which define generally a rectangle or square are secured as, for example, by welding or riveting to the four outer plates 16 which serve to confine the sound absorbing material 18 between the annular inner sheath 12 and the four walls 16. The end plates 14 and the side plates 16 are of metal so as to withstand high pressure, high temperature air or gas flow.

In the arrangement shown in Figures 3 and 4, the sound absorbing structure shown therein includes tubular units of the character shown in Figure 14. The housing 20 is constructed to receive the tubular elements 21 in zigzag fashion so that the air or gases flowing therethrough traverse generally a zigzag path. It is noted that the ends of the conduits 21 are not "square" cut but their ends are cut on a plane which makes an acute angle with respect to the longitudinal axis of the tubes, and such that adjacent ends of the tubes abut each other closely on the full circumference defining the ends of such tubes.

In Figures 3 and 4 the air and/or hot gases pass not only through the center opening of the tubes but also through the inner spaces between adjacent tubes. These tubes may be constructed as shown in Figure 14 wherein sound absorbing material 24 is confined between the inner annular foraminous sheat 25, the solid wall outer sheath 26 and the ring-shaped solid wall end plates 27 (which indeed are somewhat elliptical for the purposes intended in Figures 3 and 4). These ring-shaped members 27 may be secured with respect to the inner and outer sheaths 25 and 26 by, for example, crimping, welding, brazing, and the like. While in all cases the inner sheath is perforated, the outer sheath may be in the form of a solid wall or may also be perforated, depending upon the frequency of the noise to be attenuated.

In the arrangement shown in Figures 5 and 9 the generally square tubes or rectangular tubes, illustrated in Figure 6, are disposed in a vertical stack 30 of the structure 31 which includes a contiguous horizontal extending duct 32.

Figure 10 illustrates one form of space resonator which may be used in the arrangements shown in Figures 11, 12 and 13.

The space resonator 40 includes an inner sheath 41, an outer sheath 42, end plates or rings 43 which are secured to the inner and outer sheaths to retain the sound absorbing material 44 therein. Four spaced discs 46, 47, 48 and 49 are secured to the inner sheath 41 to provide three closed chambers 50, 51 and 52. As shown, the inner sheath 41 is of foraminous material and the outer sheath 42 comprises an annular solid wall. The size of the perforations in sheath 41 determines to a large extent the particular frequency band in which sound absorption is greatest. While the outer sheath 42 presents a solid wall, low frequency sound passes through the same and becomes attenuated. The size of the chambers 50, 51 and 52 determines also the frequencies which will be attenuated most.

In some instances the outer sheath 42 may also be perforated, i.e., may be formed of foraminous material, or only certain areas of the same may be perforated, leaving the remaining unperforated, depending upon the manner in which the space absorbers are mounted in a housing and the frequency which are desired to be attenuated most.

As shown in Figures 11 and 12, the space resonators 40 are vertically arranged in a steel or concrete conduit or housing 70 in staggered or "checkerboard" relationship so that there is no single straight line path by which the air or gases may travel from the inlet 71 to the outlet 72 of the conduit 70. These resonators 40 extend substantially the full height of the housing 70 and are spaced approximately one-half a diameter apart, so that the air or gases travel a tortuous path and impinge on the resonators in its or their travel.

As shown in Figure 13, the resonators 40 are lined up along opposite side walls of the conduit or housing 80 in two series 81, 82 with the resonators in each series abutting each other and the adjacent side wall of the conduit 80. The resonators 40 may be arranged, in such case, either horizontally or vertically, and a portion of the outer sheath of each may be perforated as mentioned above.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A space resonator comprising a generally cylindrical member having an inner sheath and an outer sheath, sound absorbing material disposed between said inner and said outer sheaths, said inner sheath being of foraminous material, and spaced discs preventing gas flow through said member in said inner sheath and defining resonant chambers with the inner wall of said inner sheath.

2. In a test stand primarily for testing jet engines, a housing having a passageway therethrough, spaced resonators through which gas is prevented from flowing disposed in said passageway in checkerboard pattern so that air or gases passing through said passage are required to travel in a tortuous path, said spaced resonators comprising vertically extending cylindrical members, each of which is defined generally by an inner foraminous cylindrical sheath and an outer cylindrical sheath, sound absorbing material disposed between said inner and outer sheaths and spaced discs preventing the flow of gases through each of said members disposed in said inner sheath and defining therewith at least one resonant chamber.

3. A test stand as set forth in claim 2 in which said outer cylindrical sheath is foraminous.

4. In a noise silencing arrangement of the character described comprising in combination, a housing having a passageway therethrough, space resonators through which gas is prevented from flowing disposed in said passage, each of said space resonators comprising vertically extending cylindrical members, each of which is defined generally by an inner foraminous cylindrical sheath and an outer cylindrical sheath, sound absorbing material disposed between said inner and outer sheaths, and spaced discs preventing the flow of gas through each of said members disposed in said inner sheath and defining therewith at least one resonant chamber.

5. An arrangement as set forth in claim 4 in which said outer cylindrical sheath is foraminous.

6. In a sound silencing arrangement of the character described a housing having a passageway therethrough, hollow closed spaced resonators through which gas is prevented from flowing disposed in said passage so that air or gases passing through said passage are required to travel past at least one of said resonators, said resonator comprising a member having an inner sheath and an outer sheath, sound absorbing material disposed between said inner and said outer sheaths, said inner sheath being of foraminous material and spaced baffle means inside said inner sheath and defining resonant chambers with the inner wall of said inner sheath.

References Cited in the file of this patent

UNITED STATES PATENTS

| | | |
|---|---|---|
| 1,153,327 | Marsh | Sept. 14, 1915 |
| 1,865,677 | Cheyney | July 5, 1932 |
| 1,916,908 | Stacey et al. | July 4, 1933 |
| 2,485,392 | Leadbetter | Oct. 18, 1949 |
| 2,516,949 | Bourne | Aug. 1, 1950 |
| 2,720,276 | Droeger | Oct. 11, 1955 |
| 2,748,883 | Ralph | June 5, 1956 |
| 2,759,555 | Baruch | Aug. 21, 1956 |
| 2,884,086 | Welbourn | Apr. 28, 1959 |

FOREIGN PATENTS

| | | |
|---|---|---|
| 452,169 | France | Mar. 1, 1913 |
| 638,407 | Great Britain | June 7, 1950 |
| 495,769 | Italy | June 21, 1954 |
| 1,109,279 | France | Sept. 21, 1955 |
| 746,949 | Great Britain | Mar. 21, 1956 |